United States Patent [19]
Kimsey

[11] 3,774,468
[45] Nov. 27, 1973

[54] ROTARY HANDGRIP ASSEMBLY FOR OPERATING BOTH THE TRANSMISSION GEAR LEVER OF A MOTOR TRUCK AND A PUSH-PULL SPEED-RATIO CONTROL SWITCH ON THAT LEVER

[76] Inventor: James H. Kimsey, Double Springs, Ala.

[22] Filed: Nov. 10, 1972

[21] Appl. No.: 305,452

[52] U.S. Cl. .............................. 74/473 R, 74/471 R
[51] Int. Cl. .............................................. G05g 13/00
[58] Field of Search ................. 74/471 R, 523, 543, 74/105, 745, 694, 473 R

[56] References Cited
UNITED STATES PATENTS
2,582,895  1/1952  Young .............................. 74/543 X
2,860,522  11/1958  Howlett ............................ 74/473 R FOREIGN PATENTS OR APPLICATIONS
951,763  10/1956  Germany ............................. 74/471

Primary Examiner—Milton Kaufman
Attorney—Arthur F. Robert

[57] ABSTRACT

A vertical transmission shift lever of a heavy duty high speed motor truck is provided with a transversely extending rotary handgrip which can be moved orbitally to shift the lever as required, and which can be moved rotationally to push or pull the speed-ratio switch as required. When moved orbitally, the transmission gears are shifted. When moved rotationally, the rear-axle gear-ratio is changed from high to low or vice versa. These movements can be made either contemporaneously or independently.

3 Claims, 6 Drawing Figures

PATENTED NOV 27 1973 3,774,468
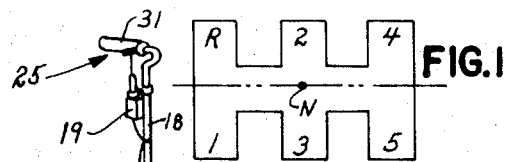
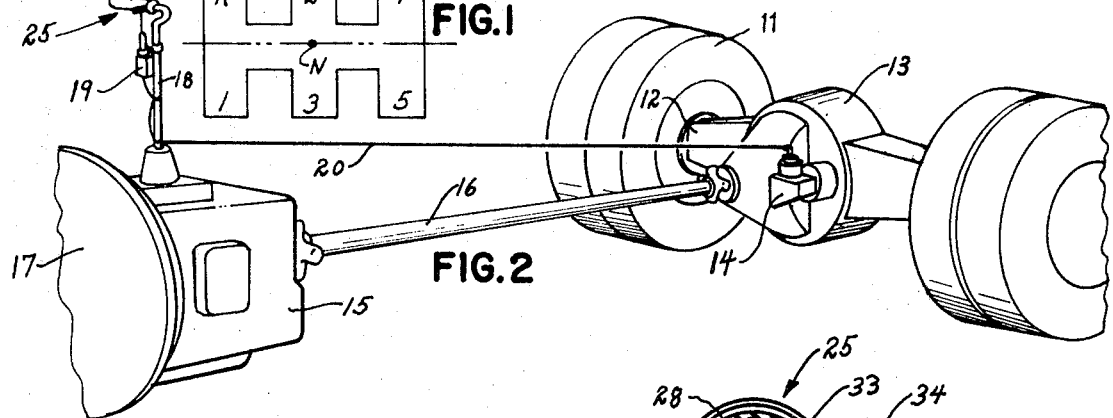
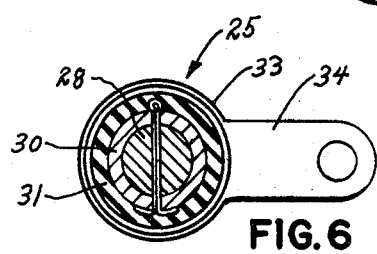
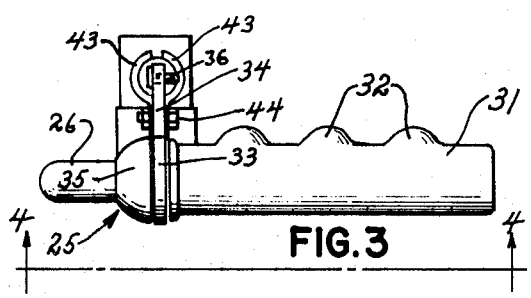
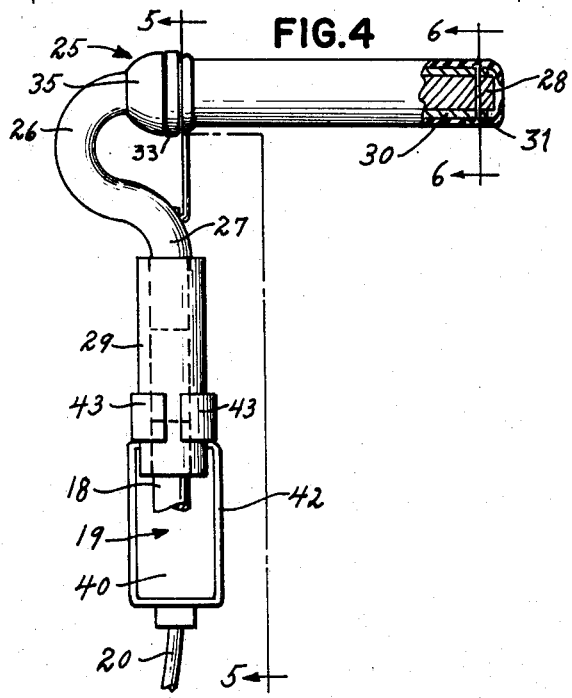
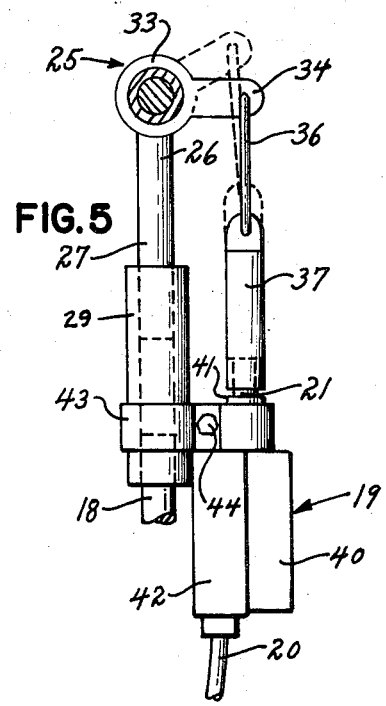

ROTARY HANDGRIP ASSEMBLY FOR OPERATING BOTH THE TRANSMISSION GEAR LEVER OF A MOTOR TRUCK AND A PUSH-PULL SPEED-RATIO CONTROL SWITCH ON THAT LEVER

BACKGROUND OF THE INVENTION

1. Field of the Invention

This invention relates to manually operated means for contemporaneously or independently shifting the transmission gear lever and operating the push-pull switch controlling the rear-axle gear-ratio of motor trucks such as freight, dump and heavy delivery trucks and mobile home toters and the like.

2. Description of the Prior Art

Heavy duty high speed motor trucks, utilizing say five or more forward transmission speeds, are equipped with dual sets of shifting mechanisms, which are arranged for contemporaneous and independent operation to provide the 10 or more speed ratios required for flexibility and economical performance over a wide range of operating speeds. In some cases, the requisite speed ratios are obtained by providing two adjacent independently operated transmissions. See U. S. Pats. to Sternberg No. 2,445,716, Matthews No. 1,866,662, Creson No. 2,497,830 and Butler et al. No. 3,049,934.

In other cases, such ratios are obtained by providing, in combination with a conventional multi-speed transmission, a two-speed-ratio gearing in the rear axle housing. The transmission is manually shifted by an upright shift lever.

The rear-axle gear-ratio is changed in one case by electrically actuated means located on the axle housing, and, in another case, by vacuum-actuated means on the axle housing. The electrically actuated means is controlled by a 2-position electrical push-pull switch mounted on the transmission shift lever. The vacuum-actuated means is similarly controlled by a 2-position electro-mechanical push-pull switch on the lever.

In one arrangement, the control switch is located within the knob of the transmission lever and operated by an arm projecting horizontally outward from that knob and pivotally mounted within the knob for horizontal movement back and forth between a high ratio position and a low ratio position.

In another widely used arrangement, the electrical push-pull switch is mounted on a lever immediately below the knob and operated by a push-pull member slidably mounted on the switch for vertical movement up and down between high and low ratio positions. The same is true of the electro-mechanical push-pull switch used in vacuum-actuated arrangements.

All of the foregoing contemporaneously performed operations involve compound movements at right angles to each other, which tend to distract the truck driver and are awkward to perform.

Otherwise, contemporaneous double shift operations, which involve changes in the rear-axle gear-ratio from low to high, present no great problem. But, where the change is from high to low, a problem is presented.

Double shift operations, involving rear-axle gear-ratio changes from high to low, must be made contemporaneously and rapidly. If not properly timed and quickly completed, the loss of road momentum is above the minimum; hence, subjects the gearing to the wear and tear of unduly hard usage and sometimes strips them. Unfortunately, it is not uncommon for a truck driver, in reaching for the knob of the shift lever, to push the control switch accidentally, effecting a premature high to low operation of it at a time when the effects on the gearing may be destructive.

SUMMARY OF THE INVENTION

Objects Of The Invention

The principal object of the invention is to provide a substantially improved dual shift arrangement which is easier to shift contemporaneously and quickly and which is less subject to the accidental operation of the rear-axle gear-ratio control switch.

Another important object is to provide a dual shift arrangement in which the contemporaneously performed operations both involve forward and rearward movements and thus avoid the distraction occasioned by and the awkwardness incident to the performance of compound movements at right angles to each other.

A further object is to accomplish the foregoing objects in a simple rugged arrangement which is easy to make, assemble and install, which effects a positive operation of the rear-axle gear- ratio control switch in both push and pull directions and which is not readily subject to damage or malfunction.

STATEMENT OF THE INVENTION

I have found that a rotary handgrip can be transversely mounted on the gear shift lever of a fast freight truck to enable the truck operator not only to shift that lever forwardly and rearwardly as required for speed change purposes but also to rotate the handgrip forwardly and rearwardly for rear-axle gear-ratio change purposes. With this arrangement, it is a relatively easy matter for the truck driver to grasp the handgrip and either (a) move it orbitally to shift the transmission lever forwardly or rearwardly as required, or (b) rotate it to the slight forward or rearward extent necessary to operate the push-pull switch as required or (c) perform both of these operations easily, quickly and contemporaneously or independently.

The use of a rotary handgrip not only more or less eliminates the accidental operation of the push-pull control switch but, by combining the forward and rearward orbital movement of the handgrip with the forward and rearward rotational movement thereof, it makes their contemporaneous and independent operations easy to perform in a manner which does not distract the truck driver. It also facilitates the performance of their contemporaneous or independent operations at the time required, particularly in effecting a change in the rear-axle gear-ratio from high to low. As a result, the life of the rear axle mechanism for actuating the gears involved in the ratio change is substantially extended and such gears are less likely to be subjected to hard use or damage.

I note: that rotary handgrips have been long used on motorcycle handle bars to enable the cyclist to manipulate the handle bars laterally for driving purposes and to rotate either or both handgrips laterally for fuel feed and other control purposes; and that the Sznycer U.S. Pat. No. 2,973,661 of Mar. 7, 1961 shows a pair of rotary handgrips mounted on a helicopter control stick wherein the stick controls the pitch of the rotor and the throttle of two motors while the rotary handgrips provide selective controls for the independent operation of the throttles of said motors.

BRIEF DESCRIPTION OF THE DRAWINGS

The invention is illustrated in the accompanying drawings wherein:

FIG. 1 is a schematic diagram indicating each of the 5 positions of the shift lever in a 10-speed arrangement;

FIG. 2 is a schematic view showing my invention mounted on the shift lever of a truck having a multi-speed transmission and a two-speed-ratio axle gear housing;

FIG. 3 is a top plan view showing a handgrip assembly constructed in accordance with my invention and mounted upon a shift lever;

FIG. 4 is a front elevation taken along a line corresponding to line 4—4 of FIG. 3, the free end of the handgrip being partly broken;

FIG. 5 is an end view corresponding to one taken along line 5—5 of FIG. 4; and

FIG. 6 is a fragmentary section taken along a line 6—6 of FIG. 4.

PRELIMINARY INFORMATION

At the outset, it may be helpful to know how the handgrip is manipulated during its movement from its neutral low ratio position to its 10 successively increasing speed positions in a 10-speed arrangement. In FIG. 1, the 5 shifted positions of the transmission lever are indicated by numerals 1 through 5. In the following TABLE A, the 10 forward speeds of the truck are correlated with the 5 positions of the transmission lever and the corresponding high or low rear axle gear ratio.

TABLE A

| Transmission Lever Positions | Rear-axle Gear-Ratios | Forward Speeds |
|---|---|---|
| Neutral | Low or High | 0 |
| 1 | Low | 1st |
| 1 | High | 2nd |
| 2 | Low | 3rd |
| 2 | High | 4th |
| 3 | Low | 5th |
| 3 | High | 6th |
| 4 | Low | 7th |
| 5 | Low | 8th |
| 4 | High | 9th |
| 5 | High | 10th |

DESCRIPTION OF THE PREFERRED EMBODIMENT

FIG. 2 illustrates a fragmentary portion (of a fast freight truck) comprising: rear wheels 11, rear axle 12 having a differential housing 13 containing an electrically shiftable two-speed-ratio assembly of axle-gears (not shown); an auxiliary casing 14 mounted on the differential housing 13 and containing the motorized assembly (not shown) for shifting the axle gears from low ratio to high and vice versa; a front transmission box 15 housing the transmission gears (not shown); drive shaft 16 connecting the transmission gears to the axle gears; an internal combustion engine 17 for driving shaft 16; gear shift lever 18 for shifting the transmission gears; and a two-position electrical push-pull switch 19 mounted on gear shift lever 18, electrically connected through insulated line wires 20 to the electric motorized assembly in the auxiliary casing 14 and operative, when its operating arm 21 is actuated up and down, to cause that motorized assembly to shift the axle gear ratio up and down.

In accordance with my invention, the knob, which is conventionally mounted on the upper end of most transmission levers 18, is removed and a handgrip assembly 25, constructed in accordance with my invention, is substituted therefor and mechanically connected to the two-position electrical push-pull switch 19 to actuate it up and down as required.

The handgrip assembly comprises: A. a fixed rod 26 having a depending vertical portion 27 and a transversely extending horizontal portion 28; B. means for fixedly mounting the rod 26 on the transmission gear shift lever 18, the means shown comprising a sleeve 29 centrally bored at its lower end portion to receive the upper end portion of lever 18 and centrally bored and threaded at its upper end portion to receive the depending vertical portion 27 of fixed rod 26; and C. a handle mountable on the transverse horizontal portion 28 of fixed rod 26, such handle, when mounted, including a hollow sleeve 30 rotationally mounted on the transverse portion 28 of rod 26, a hollow sleeve-like rubber grip 31 encircling the hollow sleeve 30 and shrunk, cemented or otherwise firmly secured thereto, finger-receiving valleys separated by rounded nubs 32 integrally formed on the grip 31, and a crank, composed of a hub 33 and an integrated radial crank arm 34, encircling the inner end of the rod portion 28 with its hub 33 welded or otherwise fixedly secured to the adjacent inner end of hollow sleeve 30 and with its crank arm 34 projecting radially outward over and spaced upwardly from push-pull switch 19. A stop is provided at the inner end of the assembly in the form of a solid semi-spherical or convex washer 35 encircling rod portion 28 adjacent hub 33 and fixed in place by suitable means such as a setscrew.

The handgrip assembly 25 of parts 26–34 should be connected to operate the upright arm 21 of push-pull switch 19 positively both upwardly and downwardly. As illustrated, this connection comprises: one vertical link 36 pivotally connected to the outer end of the crank arm 34 to depend therefrom; and a rigid link 37 pivotally connected at its upper end to the lower end of vertical link 36 and bored at its lower end to receive the upper end of the switch operating arm 21 to which it is fixedly secured by suitable mmeans such as a setscrew. The links 36 and 37 cooperate to provide a means for effecting a positive operation of the push-pull switch operating arm 21 upwardly and downwardly when the rotary unit (formed by sleeve 30, rubber grip 31, hub 33 and crank arm 34) is rotated rearwardly and forwardly.

Any suitable means may be employed to hold the push-pull switch operating arm 21 in each of two positions but I have found that the frictional resistance of the switch normally is adequate to hold it in either of its two positions until it is manually moved to its other position. However, where necessary, a frictional disc, a "spring catch" or other yieldable latching means may be employed between the rotary hub 33 and the solid convex washer 35 to hold the switch releasably in each position. By "spring catch," I mean a pair of relatively movable parts, one a fixed part and the other a rotary part with ball or bead means on one part yieldably held in a socket on the other part so that a rounded end of the ball or bead means on one part can be forced out of a socket on the other part when sufficient rotational torque is applied to the rotary part.

The two-position electrical push-pull switch 19 conventionally includes: a rubber housing 40; and a fixed upright guide sleeve 41 arranged to project upwardly from the right vertical half of the switch in position to encircle and guide its upright operating arm 21. The means for mounting the switch 19 on the shift lever 18 may be of any suitable character. The switch mounting means shown comprises: a U-shaped strap 42 on the left vertical half of the switch, this strap having a bottom bight and upstanding arms which terminate in back-to-back L-shaped ends adjacent the left side of the guide sleeve 41; and a horizontal clamping arrangement composed of opposed clamping bars 43 formed with their front ends curved to conform to and grip the fixed guide sleeve 41 of the switch, their rear ends curved to conform to and grip the transmission lever 18 and their mid-portions perforated to receive a common clamping screw 44 and nut.

In operation, we initially assume: that the transmission of a fast freight truck is in its neutral low ratio position; that the truck engine is idling and that the truck is to be moved forwardly. The truck driver normally initiates the forward movement of the truck by engaging the handle grip 31 of the transmission lever 18 and moving it (laterally to the left and rearwardly) to shift the transmission lever into its forward No. 1 speed position.

Stated more fully, incremental increases in speed may be progressively effected from a standing start by doing the following: 1st, shift the transmission lever 18 from its neutral position N into its No. 1 position with the axle-gears in their low ratio position to provide the No. 1 forward speed; 2nd, leave the lever in its No. 1 position and rotate the handgrip to shift the axle gears into their high ratio position to provide the 2nd forward speed; 3rd, shift the transmission lever 18 into its No. 2 position while contemporaneously rotating the handgrip to shift the rear axle gears into their low ratio position to provide the 3rd forward speed; 4th, leave the lever in its No. 2 position and rotate the handgrip into its high ratio position to provide the 4th forward speed; 5th, shift the transmission lever into its No. 3 position and contemporaneously rotate the handgrip into its low ratio position to provide the 5th forward speed; 6th, leave the lever in its No. 3 position and rotate the handgrip into its high ratio position to provide the 6th forward speed; 7th, shift the lever into its No. 4 position and contemporaneously rotate the grip into its low ratio position to provide the 7th forward speed; 8th, shift the lever into its No. 5 position leaving the axle gears in their low ratio position to provide the 8th forward speed; 9th, shift the lever back into its No. 4 position while rotating the grip into its high ratio position to provide the 9th forward speed; and 10th, shift the lever back into its No. 5 position while leaving the rear axle gears in their high ratio position to provide the 10th forward speed.

From the foregoing description of the manner in which accelerating speeds are accomplished, it will be understood that the shifts of the lever and the rotation of the handgrip for decelerating speeds is accomplished in the reverse manner. However, when decelerating, shift from high to low presents the same critical problem which is solved or overcome by my invention in the same way.

The manual shifting of the transmission gears is, of course, quickly made in the conventional manner. When increasing or decreasing the speed, the shift should be accomplished quickly to minimize the change in the relative speeds of one drive transmission gear and the next drive transmission gear. This change tends to take place automatically when any shift is performed and normally increases as shifting time increases.

The shifting of the rear-axle gear-ratio from low to high may be accomplished at any time during the shifting of the transmission lever. In shifting the rear-axle gear-ratio from high to low, it is highly desirable to effect that shift contemporaneously with the 2nd half portion of the shifting of the transmission lever. If the handgrip is rotated to effect the high to low shift during the last half portion of the shifting of the transmission lever, both shifting operations will normally be completed at or about the same instant of time and if this is done and the shift made quickly, clashing of the gears normally will not occur and the wear on the gears will be reduced to minimum proportions.

But, more importantly, with proper timely shifting, the rough usage of the motorized assembly in the auxiliary casing 14 will be avoided and its operative life very substantially extended. I believe that the operative life of the motorized assembly in auxiliary casing 14 may, for a given size truck, range from about 30,000 to 40,000 miles. However, my invention makes it possible to shift the rear-axle gear-ratio from high to low in a smooth, efficient and timely manner such that the life of the motorized mechanism in auxiliary housing 14 is raised to at least 85,000 miles more or less.

In a vacuum-actuated arrangement, the electro-mechanical push-pull switch, which takes the place of switch 19, is mounted on the transmission lever 18 and connected to the handgrip in the same way as the electric switch 19. The switch mechanism is electrically connected to operate a valve, which controls the application of suction to the axle vacuum shift unit, and mechanically connected to a speedometer adapter. It operates in the same manner and presents the same problems which are overcome by my invention in the same way. Further illustration and description thereof appears to be unnecessary.

From the foregoing, it will be appreciated that my manually operated mechanism for contemporaneously or independently shifting the transmission lever (18) of and operating the push-pull switch (19) controlling the high-low gear-ratio in the rear axle of a motor truck, comprises: A. a handgrip assembly (25) composed of a stationary base part (26–28) and a rotary handgrip part (30–32); B. means (29) for mounting said stationary base part to the upper end portion of the shift lever of a truck for forward, rearward and lateral shifting movement with that lever; C. means (30–32) for mounting the rotary handgrip part on the stationary base part in a transversely extending position relative to the upper end of the shift lever so that a truck operator can grasp the handgrip and bodily move it forwardly, rearwardly and laterally as required to shift the lever correspondingly, 1. said handgrip part being mounted on the base part for relative forward and rearward rotational movement about a transverse axis through an angle (14 to 20°) sufficient for push-pull switch-operating purposes; and D. means (33–37) for connecting the rotary handgrip part to the control switch for the high-low gear-ratio in the rear axle to operate that switch one way when the rotary handgrip part is rotated forwardly and the opposite way when it is rotated rearwardly.

Having described my invention, I claim:

1. A manually-operated mechanism for contemporaneously and independently shifting the transmission gear lever of and operating a push-pull switch controlling the high-low gear-ratio in the rear axle of a motor truck, comprising:
   A. a handgrip assembly composed of a stationary base part and a rotary handgrip part;
   B. means for mounting said stationary base part to the upper end portion of the shift lever of a truck for forward, rearward and lateral shifting movement with that lever;
   C. means for mounting the rotary handgrip part on the stationary base part in a transversely extending position relative to the upper end of the shift lever so that a truck operator can grasp the handgrip and bodily move it forwardly rearwardly and laterally as required to shift the lever correspondingly,
      1. said handgrip part being mounted on the base part for relative forward and rearward rotational movement about a transverse axis through an angle sufficient for push-pull switch-operating purposes; and
   D. means for connecting the rotary handgrip part to the control switch for the high-low gear-ratio in the rear axle to operate that switch one way when the rotary handgrip part is rotated forwardly and the opposite way when it is rotated rearwardly.

2. The mechanism of claim 1 wherein:
A. the handgrip mounting means comprises
   1. a transversely extending rod on the stationary base part, and
   2. a transversely extending sleeve structure on the handgrip part, the sleeve structure being rotationally fitted to the rod.

3. The mechanism of claim 2 wherein:
A. the handgrip connecting means comprises:
   1. an outwardly extending crank arm secured at its inner end to said rotary sleeve structure, and
   2. a linkage connecting the outer end portion of the crank arm to a push-pull operating member on the control switch.

* * * * *